United States Patent
Goldman et al.

(10) Patent No.: US 7,552,191 B1
(45) Date of Patent: Jun. 23, 2009

(54) METHOD AND APPARATUS TO FACILITATE AUTOMATIC SHARING IN A CLIENT SERVER ENVIRONMENT

(75) Inventors: Tomasz J. Goldman, Hellerup (DK); Claus Tøndering, Kongens Lyngby (DK)

(73) Assignee: F5 Networks, Inc., Seattle, WA (US)

( * ) Notice: Subject to any disclaimer, the term of this patent is extended or adjusted under 35 U.S.C. 154(b) by 576 days.

(21) Appl. No.: 09/881,225

(22) Filed: Jun. 12, 2001

(51) Int. Cl.
G06F 15/16 (2006.01)
G06F 13/12 (2006.01)

(52) U.S. Cl. .................. 709/217; 709/226; 710/63

(58) Field of Classification Search ......... 709/213–216, 709/226, 217; 707/8; 710/63
See application file for complete search history.

(56) References Cited

U.S. PATENT DOCUMENTS

| | | | | |
|---|---|---|---|---|
| 5,243,543 A | * | 9/1993 | Notess | 709/224 |
| 5,282,247 A | * | 1/1994 | McLean et al. | 711/164 |
| 5,428,769 A | * | 6/1995 | Glaser et al. | 700/4 |
| 5,692,111 A | * | 11/1997 | Marbry et al. | 358/1.15 |
| 5,768,524 A | * | 6/1998 | Schmidt | 709/224 |
| 5,841,991 A | * | 11/1998 | Russell | 709/216 |
| 5,857,076 A | * | 1/1999 | Schmidt | 709/224 |
| 6,012,145 A | * | 1/2000 | Mathers et al. | 726/17 |
| 6,041,063 A | | 3/2000 | Povlsen et al. | |
| 6,044,444 A | * | 3/2000 | Ofek | 711/162 |
| 6,044,468 A | * | 3/2000 | Osmond | 726/5 |
| 6,067,545 A | * | 5/2000 | Wolff | 709/216 |
| 6,073,188 A | * | 6/2000 | Fleming | 710/38 |
| 6,098,120 A | * | 8/2000 | Yaotani | 710/16 |
| 6,182,167 B1 | * | 1/2001 | Basham et al. | 710/38 |
| 6,289,023 B1 | * | 9/2001 | Dowling et al. | 370/419 |
| 6,327,613 B1 | * | 12/2001 | Goshey et al. | 709/208 |
| 6,374,352 B1 | | 4/2002 | Goldman et al. | |
| 6,389,029 B1 | * | 5/2002 | McAlear | 370/402 |
| 6,421,723 B1 | * | 7/2002 | Tawil | 709/224 |
| 6,513,101 B1 | * | 1/2003 | Fisher et al. | 707/8 |
| 6,549,966 B1 | * | 4/2003 | Dickens et al. | 710/300 |
| 6,564,371 B1 | | 5/2003 | Goldman et al. | |
| 6,611,866 B1 | | 8/2003 | Goldman et al. | |
| 6,628,661 B1 | | 9/2003 | Goldman et al. | |
| 6,665,714 B1 | * | 12/2003 | Blumenau et al. | 709/222 |
| 6,742,034 B1 | * | 5/2004 | Schubert et al. | 709/226 |
| 6,799,255 B1 | * | 9/2004 | Blumenau et al. | 711/152 |

(Continued)

FOREIGN PATENT DOCUMENTS

JP 10320142 A * 12/1998

OTHER PUBLICATIONS

Filanet, Inc., "InterJak Internet Service Appliance Administrator's Guide," 2000, 148 pages.

(Continued)

*Primary Examiner*—Larry D Donaghue
*Assistant Examiner*—Ajay Bhatia
(74) *Attorney, Agent, or Firm*—Darby & Darby P.C.; Jamie L. Wiegand

(57) ABSTRACT

A method and system of automatic share allocation in a shared resource environment. Upon connection of a device to a server, the server identifies if the device is a known device. The server then applies a share allocation previously established if the device is a known device and automatically creates a share allocation for the device if the device is not a known device.

14 Claims, 3 Drawing Sheets

U.S. PATENT DOCUMENTS

| | | | | |
|---|---|---|---|---|
| 6,807,632 | B1* | 10/2004 | Carpentier et al. | 713/165 |
| 6,895,588 | B1* | 5/2005 | Ruberg | 719/321 |
| 6,895,855 | B2* | 5/2005 | Doll | 92/72 |
| 6,940,825 | B2 | 9/2005 | Goldman et al. | |
| 6,947,991 | B1* | 9/2005 | Burton et al. | 709/221 |
| 6,957,301 | B2* | 10/2005 | Deenadhayalan et al. | 711/112 |
| 7,099,943 | B1 | 8/2006 | Tondering et al. | |
| 7,206,282 | B1 | 4/2007 | Goldman et al. | |
| 7,246,372 | B2* | 7/2007 | Takahashi et al. | 726/3 |
| 7,320,033 | B2* | 1/2008 | Bradfield et al. | 709/225 |
| 2001/0043702 | A1* | 11/2001 | Elteto et al. | 380/278 |
| 2001/0052073 | A1* | 12/2001 | Kern et al. | 713/161 |
| 2002/0078161 | A1* | 6/2002 | Cheng | 709/208 |
| 2002/0184361 | A1* | 12/2002 | Eden | 709/224 |
| 2003/0074431 | A1* | 4/2003 | Abbondanzio et al. | 709/221 |
| 2003/0115255 | A1* | 6/2003 | Kuroshima | 709/203 |
| 2003/0188162 | A1* | 10/2003 | Candelore et al. | 713/169 |
| 2004/0062209 | A1 | 4/2004 | Goldman et al. | |
| 2004/0162921 | A1* | 8/2004 | Teow et al. | 710/10 |
| 2004/0190052 | A1* | 9/2004 | Sando | 358/1.15 |
| 2004/0236731 | A1* | 11/2004 | Tamai et al. | 707/3 |
| 2005/0120082 | A1* | 6/2005 | Hesselink et al. | 709/203 |
| 2005/0154553 | A1* | 7/2005 | Wheeler et al. | 702/123 |
| 2005/0177633 | A1* | 8/2005 | Plunkett | 709/225 |
| 2005/0198222 | A1* | 9/2005 | Kohinata et al. | 709/220 |
| 2006/0173969 | A1* | 8/2006 | Wilson | 709/215 |

OTHER PUBLICATIONS

Filanet, Inc., "InterJak Internet Service Appliance Reference Manual," 2000, 234 pages.

\* cited by examiner ical, the invention relates to automatic allocation of shares

METHOD AND APPARATUS TO FACILITATE AUTOMATIC SHARING IN A CLIENT SERVER ENVIRONMENT

BACKGROUND

1. Field of the Invention

The invention relates to shared resources. More specifically, the invention relates to automatic allocation of shares for shared resources in a client-server environment.

2. Background

Use of shared resources in a client-server environment is ubiquitous. Typically, when a shared resource, such as storage devices or printers, are attached to the server, the server indicates that those devices are available for sharing by adding the device to a shared resources table. Creation of this table requires a fair amount of overhead and administration. When, for example, a disk in installed, the server goes through the basic input output system ("BIOS") to enable it to recognize the disk. The disk is then known locally and the server goes through its management interface to identify which directories (or the whole disk) are to be shared. Typically, a human administrator is required to identify which disk directories and/or printers to share, assign names to the shared resources and establish access rights. The server then interacts with the clients on the network, using, for example, server message block (SMB) protocol alternatively known as common internet file system (CIFS) protocol to define the shares allocated to various clients. The shared resources table is maintained on the server and when the shared resource device is unplugged from the server, the corresponding entries from the shared resource table are deleted. Thus, if the device is again attached, the users must reestablish their shares.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
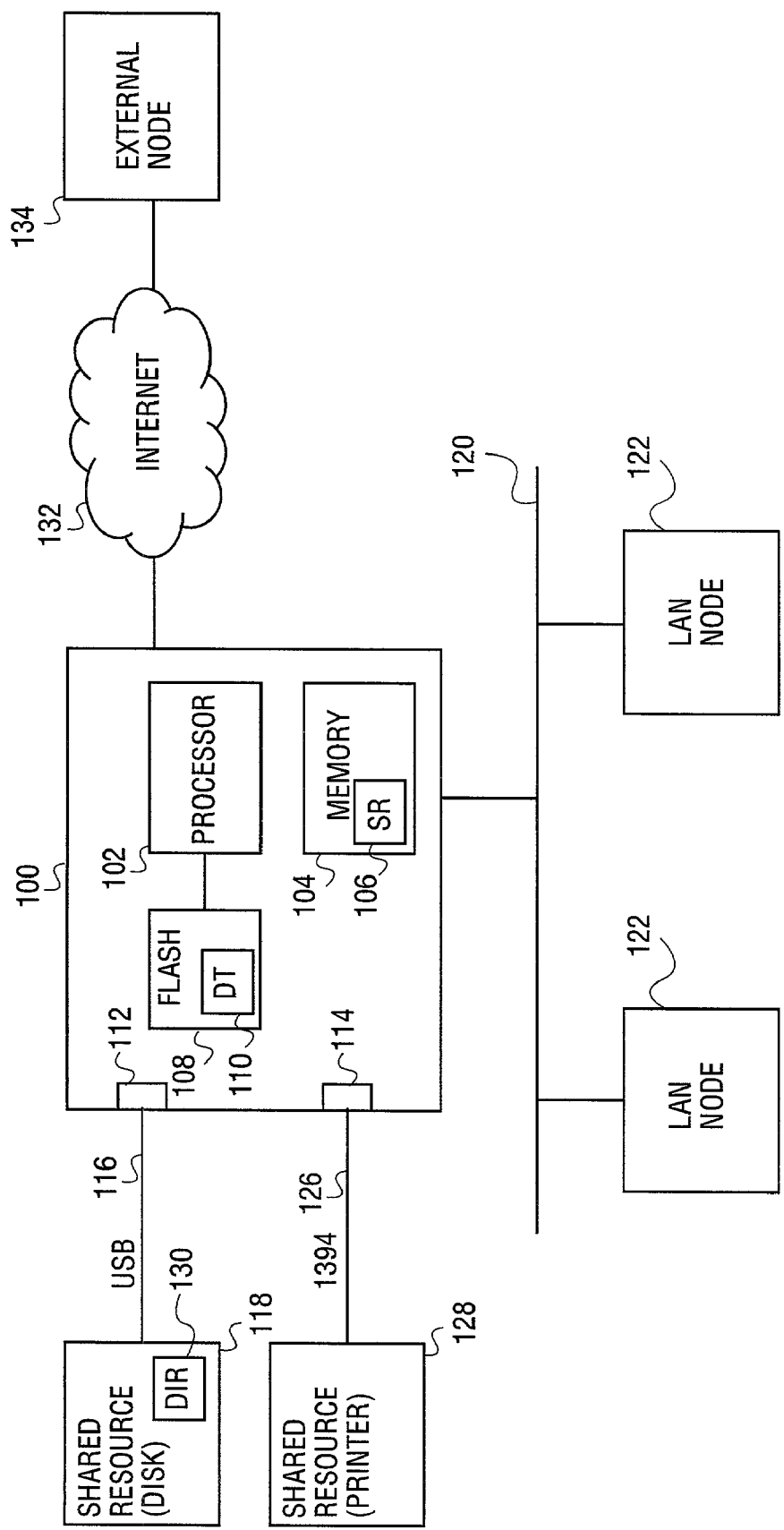
FIG. 1 is a block diagram of the system of one embodiment of the invention.

FIG. 1 is a block diagram of the system of one embodiment of the invention. The server 100 is coupled between shared resources 118, 128 and users of the shared resources such as, local area network ("LAN") nodes 122 and external node 134. LAN nodes 122 are connected to the server by LAN 120. In one embodiment, LAN 120 is an ethernet. External node 134 is coupled over a wide area network such as internet 132 to the server 100. The server 100 provides ports 112 and 114, which may provide various conectivities for the shared resources. In one embodiment, port 112 is a Universal Serial Bus ("USB") port, such that shared resource 118 is coupled by USB 116 to the server 100. In one embodiment, shared resource 118 is a storage device. In one embodiment, port 114 is an IEEE 1394 port, such that shared resource 128 is coupled by a 1394 connection 126 to the server 100. In one embodiment, resource 128 is a storage free device such as a printer, scanner, camera, etc. Server 100 includes a processor 102 coupled to a memory 104, and a non-volatile memory such as flash 108. Flash 108 contains a descriptor table that identifies storage free devices known to the server. The shared resource table 106 is maintained in the memory 104. In one embodiment, the server is a file server such as the Interjak 200 available from Filanet Corporation of Sunnyvale, Calif.

The processor detects connections to its ports 112 and 114. When a shared resource, such as printer 128 is connected, the processor identifies the connection, checks to see if the shared resource is a known resource, (e.g., exists in the descriptor table 110). In one embodiment, the server 100 reads information such as manufacturer, product name and serial number through e.g., a 1394 or USB interface, and compares that information to information in the descriptor table 110. If the shared resource exists in the descriptor table 110, it will automatically be shared under the same name under which it was previously shared. If the printer 128 is unknown, the server automatically creates a unique name under which to share the device based on information such as the manufacturer, product name, or serial number of the device. The name is then added to the descriptor table 110 so the device 128 may be recognized later. While this occurs automatically, in some embodiments, a system administrator may override the automatic name and share allocations. Moreover, while the above discussion is in the context of a printer, it applies equally to other storage free devices such as scanners, cameras, etc.

When the processor detects the connection of a storage device, such as disk 118, it automatically queries the device for the presence of a share indicator. If a share indicator is present, the device is a known device and the processor 102 adds its shares as previously defined to the shared resource table 106. In one embodiment, the processor 102 consults the directory 130 on the disk for share allocation information. The share information may be embodied as a share descriptor file which provides a description of which directories on the disk should be shared, under what names those directories should be shared, and any other parameters that govern the sharing. A check sum file may also be present to authenticate the contents of the share file. In one embodiment, the check sum file contains a MD5 check sum of the contents of the share file. If such share information is found, additional shares are allocated according to that information. The allocation is added to the shared resource table 106. If the device is not a known device, the processor assigns the device a unique name to be used when clients want to identify the device subsequently.

For unknown storage devices, shares may be automatically allocated based on the type of storage device present. For example, in one embodiment, if the device is a CD-ROM (in one embodiment, CD-ROM's are treated as a special case of a storage device), the server automatically creates a read-only browsable share which is the root directory using its volume label as the share name. For a hard disk, the automatically created share may be the root directory that is browsable and read-write. For portable media, such as Zip drives, the share automatically created may be similar to the CD-ROM case with writability enabled by manual configuration by the administrator. Because the shares are retained in the share file on the media, the generated device and share names survive both accidental and controlled restart of the server 100.

In one embodiment, while the disk 118 is plugged in, all writes are required to be "write through cache." This reduces the risk of data loss upon unplugging. Also, in one embodiment, the server 100 periodically clears a dirty bit that indicates the "volume mounted" to increase the probability that an unsolicited unplug followed by a hot plug will correctly be interpreted by the server 100 as a hot plug of a correctly dismounted disk. In one embodiment, the clearing occurs at least once per minute. If a resource is unplugged for a period of time, the processor 102 will eventually age out the entry corresponding to that resource from the descriptor table. In one embodiment, entries age out of the descriptor table after seven (7) days. After an entry is aged out, the corresponding device becomes unknown.

Figure 2A:
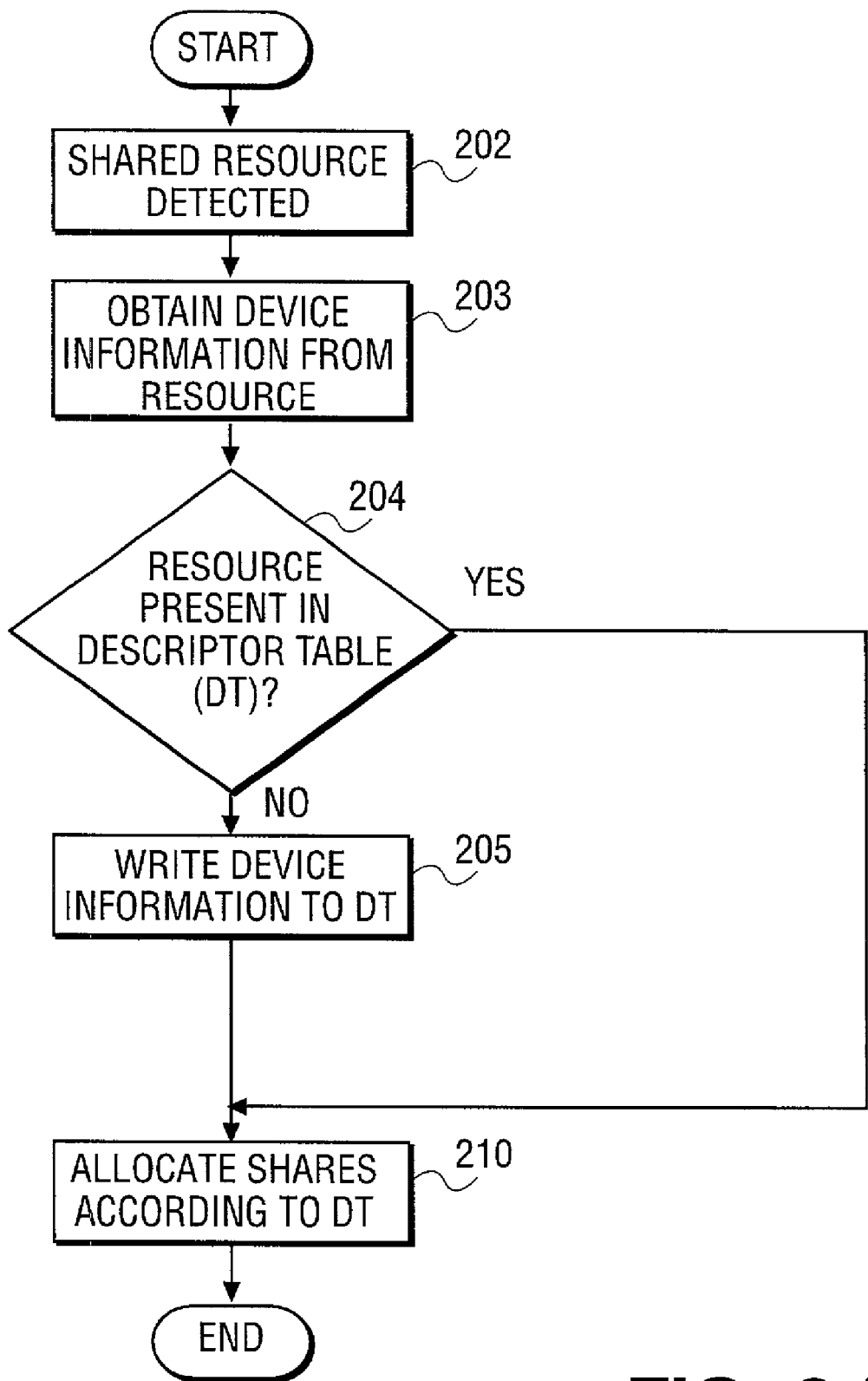
FIG. 2A is a flow diagram of automatic sharing of a storage free device in one embodiment of the invention.

FIG. 2A is a flow diagram of automatic sharing of a storage free device in one embodiment of the invention. At functional block 202, a shared resource is detected as being connected to the server. At functional block 203, the server obtains device information from the resource. The device information may include product name, manufacturer, serial number, etc. In some embodiments, this information is read directly through the USB or 1394 interface. A determination is made at decision block 204 whether the shared resource is a known device by determining if it is present in the descriptor table. If the shared resource is not in the descriptor table, the device information is written to the descriptor table. If the shared resource is present or after it is added in the descriptor table, shares are allocated according to the entry in the descriptor table at functional block 210.

Figure 2B:
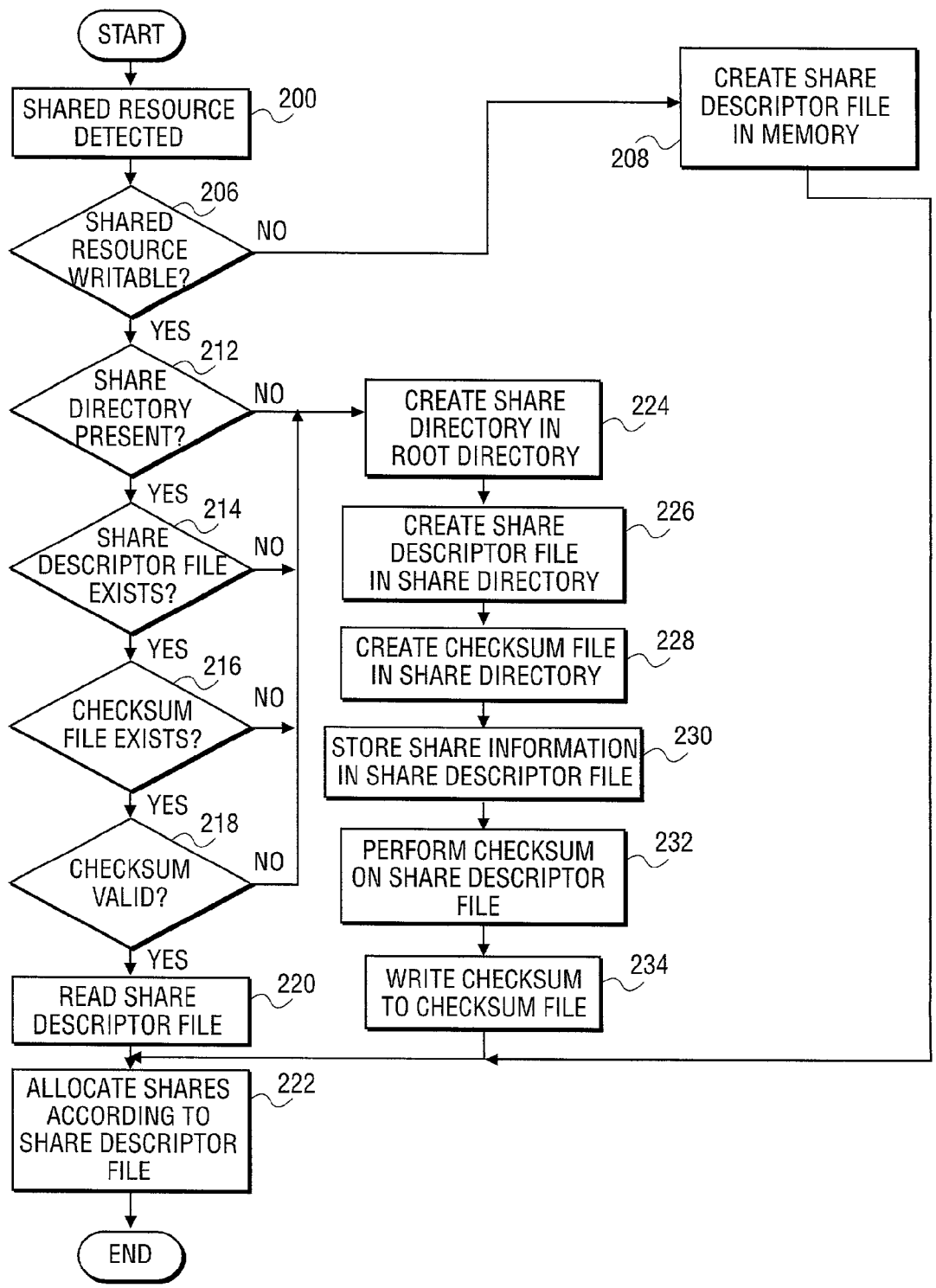
FIG. 2B is a flow diagram of automatic sharing of a storage device in one embodiment of the invention.

FIG. 2B is a flow diagram of automatic sharing of a storage device in one embodiment of the invention. At functional block 200, a shared resource is detected as being connected to the server. A determination is made at decision block 206 if the shared resource is writable. For example, is the shared resource a disk, which would be writable, or is this shared resource, e.g., a CD-ROM, which would not be writable. If the device is not writable, a share descriptor file is created in the memory of the server at functional block 208. The share descriptor file, in one embodiment, specifies that the root of the device shall be shared.

If at decision block 206 the shared resource is writable, the determination is made at decision block 212 whether a share directory is present. If the share directory is present, at decision block 214 a determination is made if a share descriptor file exists. If the share descriptor file exists, a decision is made at decision block 216 whether a check sum file exists. If the check sum file exists, the contents of the check sum file are evaluated at decision block 218 to determine if the check sum is valid. The check sum may be, for example, an MD5 check sum of the contents of the share file. If the check sum is valid at functional block 220, the share descriptor file is read. Then at functional block 222, shares are allocated according to the contents of the share descriptor file. Those shares are then reflected in a share descriptor file in memory and the shared resource table.

If at any of decision blocks 212 through 218, the directory, file, or check sum are not present or not valid, the server creates a share directory in the root directory of the storage device at functional block 224. In this context, "creates" means to generate if not yet existing and to clear and repopulate if already existing e.g., the case where the directory exists, but the check sum is invalid. At functional block 226, a share descriptor file is created in the share directory. At functional block 228, a check sum file is created in the share directory. The share descriptor file contains the information defining the sharing of the device as discussed above. In one embodiment, the share descriptor file specifies that the root of the device is to be shared. At functional block 230, share information is stored in the share descriptor file. At functional block 232, a check sum is performed on the share file. At functional block 234, the check sum determined is written to the check sum file. Shares of the resource are then allocated according to the contents of the share file at functional block 222.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   automatically detecting attachment of a shared resource device to a server;
   automatically querying if the shared resource device is associated with a share indicator stored at the shared resource device;
   determining if a share directory is present on the shared resource device;
   determining if a share file is in the share directory,
   determining if a checksum file exists in the share directory;
   validating a checksum in the checksum file;
   applying share allocation defined by the share indicator if the share indicator is present at the shared resource device; and
   if the share indicator is stored separate from the shared resource device, automatically creating a share file for the share indicator at the server that enables identification of the shared resource device, and automatically allocating sharing of the shared resource device.

2. The method of claim 1 further comprising:
   creating a share indicator on the shared resource device if the share indicator is not present.

3. The method of claim 2 wherein creating comprises:
   creating a share directory on the shared resource device; and
   creating a share file in the share directory.

4. The method of claim 3 wherein creating further comprises:
   creating a checksum file in the share directory; and
   writing a checksum in the checksum file.

5. A computer readable storage media containing executable computer program instructions which when executed cause a digital processing system to perform a method comprising:
   automatically detecting attachment of a shared resource device to a server;
   automatically querying if the shared resource device is associated with a share indicator stored at the shared resource device;
   determining if a share directory is present on the shared resource device;
   determining if a share file is in the share directory;
   determining if a checksum file exists in the share directory;
   validating a checksum in the checksum file;
   applying share allocation defined by the share indicator if the share indicator is present at the shared resource device; and
   if the share indicator is stored separate from the shared resource device, automatically creating a share file for the share indicator at the server that enables identification of the shared resource device, and automatically allocating sharing of the shared resource device.

6. The computer readable storage media of claim 5 which when executed cause a digital processing system to perform a method further comprising:

creating a share indicator on the shared resource device if the share indicator is not present.

7. The computer readable storage media of claim 6 which when executed cause a digital processing system to perform a method further comprising:

creating a share directory on the shared resource device; and creating a share file in the share directory.

8. The computer readable storage media of claim 7 which when executed cause a digital processing system to perform a method further comprising:

creating a checksum file in the share directory; and writing a checksum in the checksum file.

9. A system comprising:

a processor;

a non-volatile storage unit coupled to the processor, the non-volatile storage unit to store a descriptor table having an entry identifying share allocation for a known storage free device; and a memory coupled to the processor to store a shared resource device table to identify share allocation of shared devices coupled to the system, wherein if an unknown storage free device is coupled to the system, the processor automatically creates a share file in the shared resource device table that enables identification and automatically allocates sharing of the unknown storage free device; and a writable shared resource device coupled to the processor, wherein when the writable shared resource device is initially coupled to the system, the processor automatically queries if the writable shared resource device contains a share directory stored thereon, and if so, then determines if a checksum file exists in the share directory, and if the checksum file exists, validates a checksum in the checksum file.

10. The system of claim 9 wherein the processor ages out the entry if the known device is not present for a period of time.

11. The system of claim 9 further comprising:

a read only shared resource device wherein the processor detects connection of the read only shared resource device and automatically adds an entry to the descriptor table responsive to the connection.

12. The system of claim 9 further comprising:

a writable shared resource device wherein the processor detects connection of the writable shared resource device and automatically adds an entry to the shared resource device table responsive to the connection.

13. A method comprising:

maintaining a descriptor table on a server in a non-volatile memory for a plurality of known devices;

detecting attachment of a device to the server;

determining if the device is one of the plurality of known devices;

applying a share allocation from the descriptor table upon attachment if the device is one of the plurality of known devices; and if the device is determined to be an unknown device,
  automatically querying if the unknown device includes a share indicator stored on the unknown device, and if so:
    determining if a share directory is present on the unknown device;
    determining if a checksum file is in the share directory, and if so, validating a checksum in the checksum file; otherwise:
    automatically creating a share indicator on the unknown device; and
  automatically creating a corresponding share entry in the descriptor table that enables identification and automatically allocating sharing of the unknown device.

14. The method of claim 13 further comprising:

aging out entries from the descriptor table after a corresponding known device has been detached for a period of time.

* * * * *